(12) United States Patent
Beltramin et al.

(10) Patent No.: US 11,623,671 B2
(45) Date of Patent: Apr. 11, 2023

(54) BLOCKCHAIN REMOTE COMMAND VERIFICATION

(71) Applicant: Progress Rail Locomotive Inc., LaGrange, IL (US)

(72) Inventors: Sidarta F. Beltramin, Brasil (BR); Fernando D. Belo, Paraná (BR); Guilherme Martini, Curitiba Paraná (BR); Evan P. Sevel, Huntsville, AL (US); James D. Seaton, Downers Grove, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 768 days.

(21) Appl. No.: 16/381,547

(22) Filed: Apr. 11, 2019

(65) Prior Publication Data

US 2020/0324798 A1    Oct. 15, 2020

(51) Int. Cl.
*B61L 15/00* (2006.01)
*G06F 16/27* (2019.01)
*H04L 67/12* (2022.01)

(52) U.S. Cl.
CPC ....... *B61L 15/0063* (2013.01); *B61L 15/0018* (2013.01); *B61L 15/0072* (2013.01); *G06F 16/27* (2019.01); *H04L 67/12* (2013.01)

(58) Field of Classification Search
CPC ......... B61L 3/127; G06F 16/27; H04L 9/0637
See application file for complete search history.

(56) References Cited

U.S. PATENT DOCUMENTS

| | | | |
|---|---|---|---|
| 9,522,687 B2 | 12/2016 | Seaton et al. | |
| 2016/0176424 A1 | 6/2016 | Kupiec et al. | |
| 2016/0304106 A1* | 10/2016 | Seaton | B61L 27/0077 |
| 2018/0294956 A1* | 10/2018 | O'Brien | G06F 11/1464 |
| 2020/0143267 A1* | 5/2020 | Gidney | H04L 63/123 |
| 2020/0313877 A1* | 10/2020 | Mondello | H04L 9/3263 |
| 2020/0327969 A1* | 10/2020 | Malvankar | G06N 20/20 |
| 2021/0116907 A1* | 4/2021 | Altman | G01C 21/3461 |

FOREIGN PATENT DOCUMENTS

| | | |
|---|---|---|
| AU | 2015200258 A1 | 2/2015 |
| CN | 103178956 B | 5/2017 |
| JP | 2838197 B2 | 12/1998 |

* cited by examiner

*Primary Examiner* — Peter D Nolan
*Assistant Examiner* — Ce Li Li
(74) *Attorney, Agent, or Firm* — Bookoff McAndrews PLLC (57) ABSTRACT

The preset disclosure provides a control system for operating one or more locomotives in a train, the control system including a first communication unit located on-board a first locomotive of a first consist in the train; and an off-board remote controller interface located remotely from the train, the off-board remote controller interface being configured to receive or generate a locomotive control command, store the received or generated locomotive control command in a shared ledger, and relay the locomotive control command to the first communication unit. The first communication unit is configured to receive the locomotive control command from the off-board remote controller interface.

20 Claims, 5 Drawing Sheets

BLOCKCHAIN REMOTE COMMAND VERIFICATION

TECHNICAL FIELD

The present disclosure relates generally to a system and method for remotely operating locomotives and, more particularly, to a system and method for verifying commands for remotely operating locomotives.

BACKGROUND

Rail vehicles may include multiple powered units, such as locomotives, that are mechanically coupled or linked together in a consist. The consist of powered units operates to provide tractive and/or braking efforts to propel and stop movement of the rail vehicle. The powered units in the consist may change the supplied tractive and/or braking efforts based on a data message that is communicated to the powered units. For example, the supplied tractive and/or braking efforts may be based on Positive Train Control (PTC) instructions or control information for an upcoming trip. The control information may be used by a software application to determine the speed of the rail vehicle for various segments of an upcoming trip of the rail vehicle.

A goal in the operation of the locomotives in a train is to eliminate the need for an operator on-board the train. This may be desirable, for example, for use with an automated switcher in a rail yard to assemble a train without human operators present in train components. In order to achieve the goal of providing automatic train operation (ATO), a reliable control system must be provided in order to transmit train control commands and other data indicative of operational characteristics associated with various subsystems of the locomotive consists between the train and an off-board, remote controller interface (also sometimes referred to as the "back office"). The control system must be capable of transmitting data messages having the information used to control the tractive and/or braking efforts of the rail vehicle and the operational characteristics of the various consist subsystems while the rail vehicle is moving. The control system must also be able to transmit information regarding a detected fault on-board a locomotive, and respond with control commands to reset the fault. Such automated operation controlled by an off-board, remote controller interface.

One method for receiving information on the status of a locomotive and sending commands to the locomotive from a remote controller interface is disclosed in U.S. Pat. No. 9,522,687 of Seaton et al. that issued on Dec. 20, 2016 ("the '687 patent"). In particular, the '687 patent discloses a "remote controller interface" used to convey a variety of network data and command and control signals in the form of messages communicated to a vehicle, such as a train. However, in the scenario where locomotives are being commanded remotely, such as in Automatic Train Operation, the verification of command and response communication may be critical, including security and safety concerns. Especially when an operator is not onboard, it may be difficult to recognize and intervene to stop an unsafe or operationally poor situation. The '687 patent may be limited in this regard. In particular, the '687 patent does not provide for verification of the contents or sequencing of the sensor signals, commands, and responses transmitted to/from the vehicle and associated components.

The present disclosure is directed at overcoming one or more of the shortcomings set forth above and/or other problems of the prior art. The scope of the current disclosure, however, is defined by the attached claims, and not by the ability to solve any specific problem.

SUMMARY

The preset disclosure provides a control system for operating one or more locomotives in a train, the control system including a first communication unit located on-board a first locomotive of a first consist in the train; and an off-board remote controller interface located remotely from the train, the off-board remote controller interface being configured to receive or generate a locomotive control command, store the received or generated locomotive control command in a shared ledger, and relay the locomotive control command to the first communication unit. The first communication unit is configured to receive the locomotive control command from the off-board remote controller interface.

In a further aspect, the present disclosure provides a train control system including a first consist of locomotives, the first consist comprising a first locomotive and one or more first trailing locomotives; a first communication unit located on-board the first locomotive of the first consist; and an off-board remote controller interface located remotely from the train. The off-board remote controller being configured to: receive or generate a locomotive control command; store the received or generated locomotive control command in a shared ledger; and relay the locomotive control command to the first locomotive of the first consist by transmitting a signal corresponding to the locomotive control command from the off-board remote controller interface to the first lead communication unit.

In a further aspect, the present disclosure provides a method for controlling a train, the train including a first consist of locomotives, and a first communication unit located on-board a first locomotive of the first consist. The method further includes: receiving or generating a locomotive control command by an off-board remote controller interface; storing, by the off-board remote controller interface, the received or generated locomotive control command in a shared ledger; and relaying the locomotive control command to the first communication unit.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Various embodiments of the present disclosure relate generally to verifying commands for remotely operating locomotives.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Any suitable system infrastructure may be put into place to allow verifying commands for remotely operating locomotives. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As discussed above, in the scenario where locomotives are being commanded remotely, such as in Automatic Train Operation, the verification of command and response communications may be desired, including to address security and safety concerns. Especially when an operator is not onboard, it may be difficult to recognize and intervene to stop an unsafe or operationally poor situation. Previously known systems may not provide for verification of the contents or sequencing of the sensor signals, commands, and responses transmitted to/from the vehicle and associated components.

One technology that is available to address these concerns is a shared ledger, such as a blockchain. In a blockchain shared ledger, information about a sequence of transactions is stored in a public, semi-public, or private database, or "chain," of transactions. Each transaction is represented in a "block" of information that includes information about a transaction. For financial transactions, such as for bitcoin cryptocurrency, this information may include the parties to the transaction and the transaction amount. However, other interactions may also be represented as transactions in a blockchain shared ledger. For example, in one or more embodiments of the present disclosure, each command or sensor signal transmitted between components of a railroad, such as, for example, locomotives, wagons, hi-rail vehicles, or other rolling stock, wayside communication stations, signals, track switches, back office(s), cloud based servers, etc., may be represented as a "transaction" in the blockchain shared ledger.

One feature of a blockchain shared ledger is that the transactions are verified and then stored in a block that is given a timestamp and a unique identifier or "hash." The combination of the verification and the unique hash for a block ensures that falsified transactions cannot be entered into the shared ledger, and the recorded transactions are immutable. That is, a transaction, once recorded, cannot be deleted or altered without detection. The sequence of transactions, likewise, cannot be altered without detection.

A blockchain shared ledger may be distributed in a peer-to-peer network, such that identical copies of the shared ledger is stored on the computing resources of multiple peers in the network. Thus, any attempt to alter a block on one peer may be easily detected by comparison with unaltered copies of the shared ledger on other peers. In one or more embodiments, computing resources and electronic storage present in each component of a rail system, including, for example, rolling stock, wayside communication stations, back office(s), cloud based servers, etc., may operate as peers in the peer-to-peer network supporting a blockchain shared ledger, with each peer possibly storing a separate copy of the shared ledger.

Verification of a transaction may be by a "proof of work" scheme or a "proof of stake" scheme. In a "proof of work" scheme, verification requires performing an expensive computer calculation, such that the cost of verification is greater than a malicious party would want expend to create a falsified transaction, thus ensuring that verification can be trusted. In a "proof of stake" scheme, a verifier submits financial (or other) resources that would be forfeited in the event of a falsified transaction. The financial stake is greater than what a malicious party would want to risk in order to create a falsified transaction, thus ensuring that verification can be trusted. Verification may be provided by peers distributed across the network, thus eliminating a single point of failure or attack.

The following discussion introduces the components of a railroad system that may be involved in remote control and signaling of locomotives, switches, etc. Following this introduction, the application of blockchain shared ledger technology to such remote control and signaling will be described.

Figure 1:
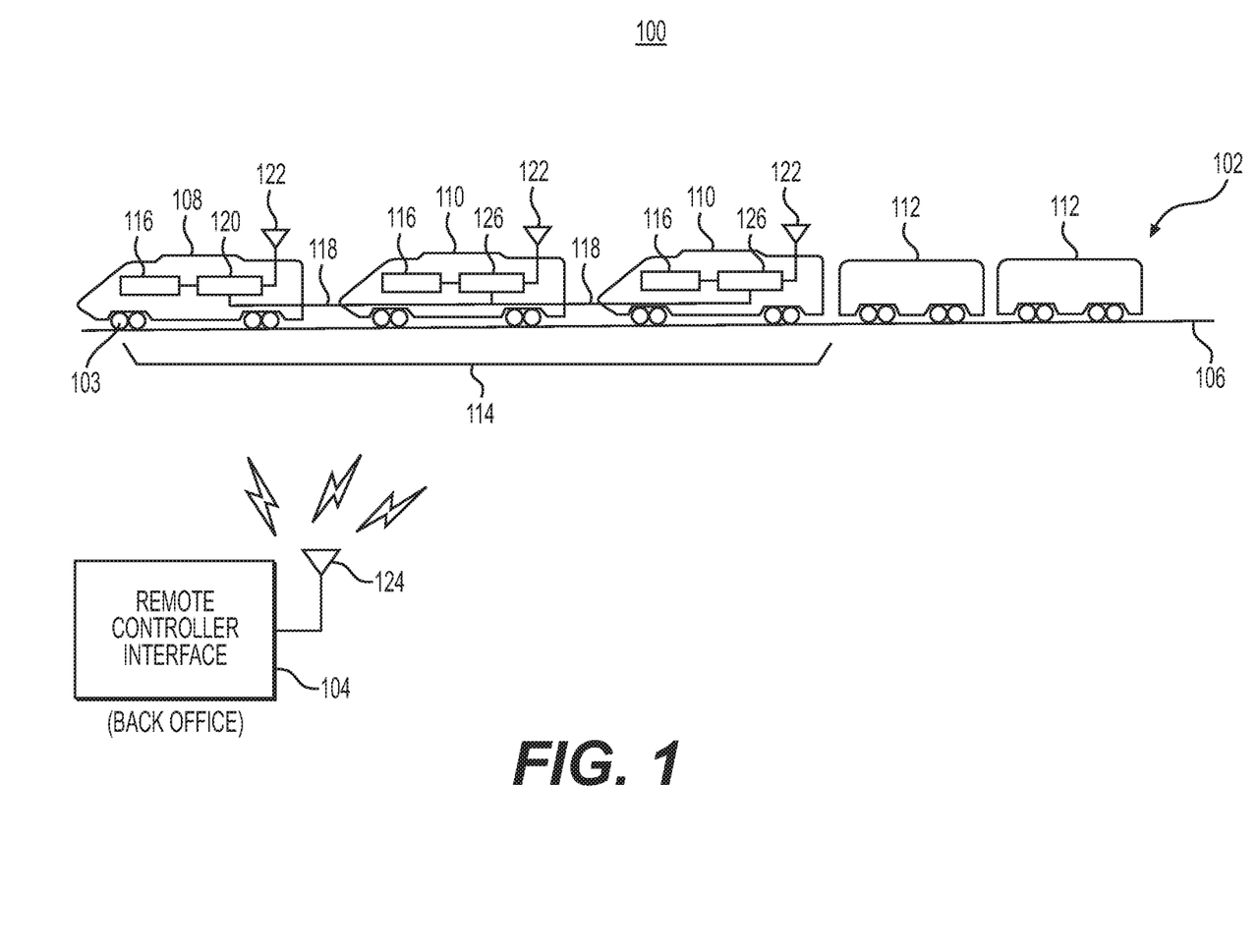
FIG. 1 is a schematic diagram of one embodiment of a control system for a train.

FIG. 1 is a schematic diagram of one embodiment of a control system 100 for operating a train 102 traveling along a track 106. The train may include multiple rail cars (including powered and/or non-powered rail cars or units) linked together as one or more consists or a single rail car (a powered or non-powered rail car or unit). The control system 100 may provide for cost savings, improved safety, increased reliability, operational flexibility, and convenience in the control of the train 102 through communication of network data between an off-board remote controller interface 104 and the train 102. The control system 100 may also provide a means for remote operators or third party operators to communicate with the various locomotives or other powered units of the train 102 from remote interfaces that may include any computing device connected to the Internet or other wide area or local communications network. The control system 100 may be used to convey a variety of network data and command and control signals in the form of messages communicated to the train 102, such as packetized data or information that is communicated in data packets, from the off-board remote controller interface 104. The off-board remote controller interface 104 may also be configured to receive remote alerts and other data from a controller on-board the train, and forward those alerts and data to desired parties via mobile telephone, email, and online screen alerts. The data communicated between the train 102 and the off-board remote controller interface 104 may include signals indicative of various operational parameters associated with components and subsystems of the train, and command and control signals operative to change the state of various circuit breakers, throttles, brake controls, actuators, switches, handles, relays, and other electronically-controllable devices on-board any locomotive or other powered unit of the train 102.

The off-board remote controller interface 104 may be connected with an antenna module 124 configured as a wireless transmitter or transceiver to wirelessly transmit data messages to the train 102. The messages may originate elsewhere, such as in a rail-yard back office system, one or more remotely located servers (such as in the "cloud"), a third party server, a computer disposed in a rail yard tower, and the like, and be communicated to the off-board remote controller interface 104 by wired and/or wireless connections. Alternatively, the off-board remote controller interface 104 may be a satellite that transmits the message down to the train 102 or a cellular tower disposed remote from the train 102 and the track 106. Other devices may be used as the off-board remote controller interface 104 to wirelessly transmit the messages. For example, other wayside equipment, base stations, or back office servers may be used as the off-board remote controller interface 104. By way of example only, the off-board remote controller interface 104 may use one or more of the Transmission Control Protocol (TCP), Internet Protocol (IP), TCP/IP, User Datagram Protocol (UDP), or Internet Control Message Protocol (ICMP) to communicate network data over the Internet with the train 102. As described below, the network data can include information used to automatically and/or remotely control operations of the train 102 or subsystems of the train, and/or reference information stored and used by the train 102 during operation of the train 102. The network data communicated to the off-board remote controller interface 104 from the train 102 may also provide alerts and other operational information that allows for remote monitoring, diagnostics, asset management, and tracking of the state of health of all of the primary power systems and auxiliary subsystems such as HVAC, air brakes, lights, event recorders, and the like.

In addition to providing network data and command and control signals to train 102, off-board remote controller interface 104 may exchange network data and command and control signals with other components of control system 100, such as, for example, sensors and switches disposed on track 106, and other components of control system 100.

Off-board remote controller interface 104 may store a record of the data received and transmitted in a database, such as a shared ledger. The shared ledger may be a blockchain shared edger. Multiple copies of the shared ledger may be distributed among computing resources available on components of control system 100.

The train 102 may include a lead consist 114 of powered locomotives, including the interconnected powered units 108 and 110, one or more remote or trailing consists (discussed below with respect to FIG. 5), and additional non-powered units 112. "Powered units" refers to rail cars that are capable of self-propulsion, such as locomotives. "Non-powered units" refers to rail cars that are incapable of self-propulsion, but which may otherwise receive electric power for other services.

In the illustrated embodiment of FIG. 1, the powered units 108, 110 represent locomotives joined with each other in the lead consist 114. The lead consist 114 represents a group of two or more locomotives in the train 102 that are mechanically coupled or linked together to travel along a route. The lead consist 114 may be a subset of the train 102 such that the lead consist 114 is included in the train 102 along with additional trailing consists of locomotives and additional non-powered units, such as freight cars or passenger cars.

The powered units 108, 110 of the lead consist 114 include a lead powered unit 108, such as a lead locomotive, and one or more trailing powered units 110, such as trailing locomotives. As used herein, the terms "lead" and "trailing" are designations of different powered units, and do not necessarily reflect positioning of the powered units 108, 110 in the train 102 or the lead consist 114. In one or more embodiments, the term "lead" refers to a powered unit that is designated for primary control of the lead consist 114, and "trailing" refers to powered units that are under at least partial control of a lead powered unit.

The powered units 108, 110 may include a connection at each end of the powered unit 108, 110 to couple propulsion subsystems 116 of the powered units 108, 110 such that the powered units 108, 110 in the lead consist 114 may function together as a single tractive unit.

The propulsion subsystems 116 of the powered units 108, 110 in the lead consist 114 may be connected and communicatively coupled with each other by a network connection 118. In one embodiment, the network connection 118 may include a net port and jumper cable that extends along the train 102 and between the powered units 108, 110.

The powered units 108, 110 may include communication units 120, 126 configured to communicate information used in the control operations of various components and subsystems, such as the propulsion subsystems 116 of the powered units 108, 110. The communication unit 120 disposed in the lead powered unit 108 may be referred to as a lead communication unit. As described below, the lead communication unit 120 may be the unit that initiates the transmission of data packets forming a message to the off-board, remote controller interface 104. For example, the lead communication unit 120 may transmit a message via a WiFi or cellular modem to the off-board remote controller interface 104. The message may contain information on an operational state of the lead powered unit 108, such as a throttle setting, a brake setting, readiness for dynamic braking, the tripping of a circuit breaker on-board the lead powered unit, or other operational characteristics. The communication units 126 may be disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112.

The networked communication units 120, 126 may include antenna modules 122. The antenna modules 122 may represent separate individual antenna modules or sets of antenna modules disposed at different locations along the train 102. The antenna modules 122 may be configured to send data to and receive data from the off-board remote controller interface 104. For example, the off-board remote controller interface 104 may include an antenna module 124 that wirelessly communicates the network data from a remote location that is off of the track 106 to the train 102 via one or more of the antenna modules 122. Alternatively, the antenna modules 122 may be connectors or other components that engage a pathway over which network data is communicated, such as through an Ethernet connection.

The diverse antenna modules 122 may enable the train 102 to receive the network data transmitted by the off-board remote controller interface 104 at multiple locations along the train 102. Increasing the number of locations where the network data can be received by the train 102 may increase the probability that all, or a substantial portion, of a message conveyed by the network data is received by the train 102. For example, if some antenna modules 122 are temporarily blocked or otherwise unable to receive the network data as the train 102 is moving relative to the off-board remote controller interface 104, other antenna modules 122 that are not blocked and are able to receive the network data may receive the network data. An antenna module 122 receiving data from the off-board device 104 may in turn re-transmit that received data to the appropriate lead communication unit 120 of the lead locomotive consist 114. Any data packet of information received from the off-board remote controller interface 104 may include header information or other means of identifying which locomotive in which locomotive consist the information is intended for. Although the lead communication unit 120 on the lead consist may be the unit that initiates the transmission of data packets forming a message to the off-board, remote controller interface 104, all of the lead and trailing communication units may be configured to receive and transmit data packets forming messages. Accordingly, in various alternative implementations according to this disclosure, a command control signal providing operational commands for the lead and trailing locomotives may originate at the remote controller interface 104 rather than at the lead powered unit 108 of the lead consist 114.

Control over engine operation (e.g., starting, stopping, fueling, exhaust after-treatment, etc.) and traction motor operation, as well as other locomotive controls, may be provided by way of various controls housed within a cab supported by the frame of the train 102. In some implementations of this disclosure, initiation of these controls may be implemented in the cab of the lead powered unit 108 in the lead consist 114 of the train 102. In other alternative implementations, initiation of operational controls may be implemented off-board at the remote controller interface 104, or at a powered unit of a trailing consist.

Figure 2:
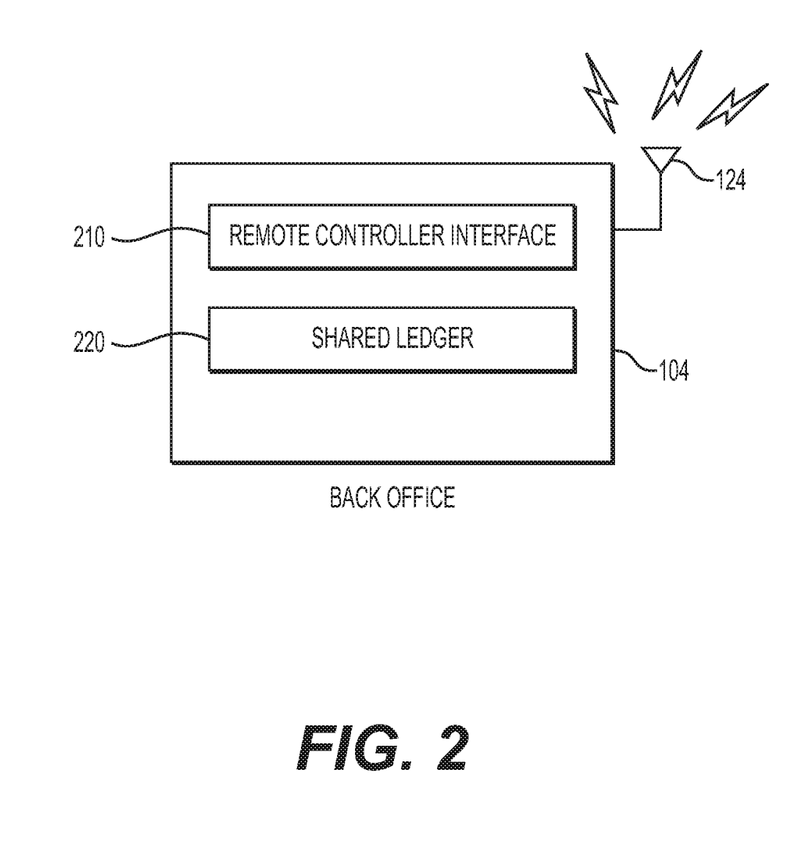
FIG. 2 is a block diagram of one embodiment of a remote controller interface in a control system for a train illustrated in FIG. 1.

As shown in FIG. 2, remote controller interface 104 may include a remote controller interface module 210 and a shared ledger 220. The off-board remote controller interface module 210 may also be configured to receive remote alerts and other data from a controller on-board the train, and forward those alerts and data to desired parties via mobile telephone, email, and online screen alerts. The data communicated between the train 102 and the off-board remote controller interface module 210 may include signals indicative of various operational parameters associated with components and subsystems of the train 102 and track 106, and command and control signals operative to change the state of various circuit breakers, throttles, brake controls, actuators, switches, handles, relays, and other electronically-controllable devices on-board any locomotive or other powered unit of the train 102. The command and control signals may also be operative to change the state of switches, signals, and other electronically-controllable devices of track 106.

The off-board remote controller interface module 210 may also be configured to receive commands from a human operator through a user interface of a control panel situated in a command center or back office. The control panel may be embodied as a special-purpose control panel including physical controls and/or virtual controls on an electronic display. Alternatively, the control panel may be embodied as a graphical user interface displayed on an electronic display of a general-purpose computer, tablet, or mobile device.

Shared ledger 220 may be a shared ledger, such as a blockchain shared ledger, that records messages exchanged by remote controller interface module 210. For example, the exchanged messages may include driving commands, status feedback, movement authority, speed restriction, sensor data, signal status, etc. Alternatively, shared ledger 220 may record a cryptocurrency, where the cryptocurrency is associated with the corresponding message stored, for example, in a log file or event recorder.

In one or more embodiments, the messages stored in shared ledger 220, or associated with cryptocurrency stored in shared ledger 220, may be inspected as an event recorder such as for incident investigations, for example. Thus, shared ledger 220 may be utilized like a remotely located black box. In such a usage, shared ledger 220 may record all network messages, or may be used to assemble the various recorded transactions of messages processed by off-board remote controller interface module 210.

The discussion below provides further details of the operations of train 102, including lead powered unit 108 in the lead consist 114, with respect to remote data an operational commands processed by remote controller interface 104 and stored in shared ledger 220.

Figure 3:
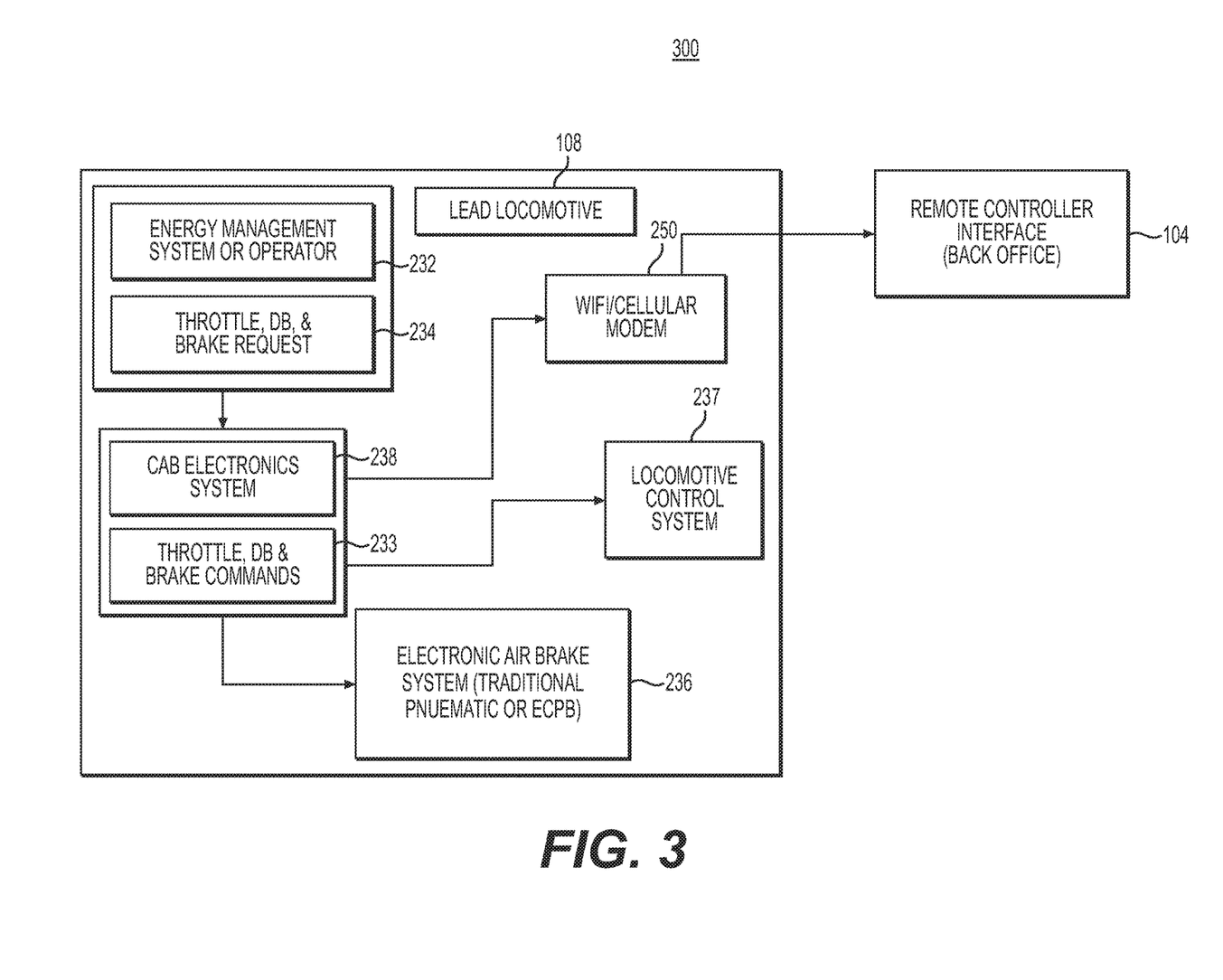
FIG. 3 is a block diagram of one implementation of a portion of the control system illustrated in FIG. 1.

As shown in FIG. 3, an exemplary embodiment of a control system 300 according to this disclosure may include an on-board controller of a lead locomotive 108 comprising an energy management system or human operator 232. The energy management system 232 may be configured to automatically determine one or more of throttle requests, dynamic braking requests, and pneumatic braking requests 234 for one or more of the powered and non-powered units of the train. The energy management system 232 may be configured to make these various requests based on a variety of measured operational parameters, track conditions, freight loads, trip plans, and predetermined maps or other stored data with a goal of improving one or more of availability, safety, timeliness, overall fuel economy and emissions output for individual locomotives, consists, or the entire train. The cab of the lead locomotive 108 may also house a plurality of input devices and control system interfaces. The input devices may be used by an operator to manually control the locomotive, or may be controlled electronically via messages received from off-board the train. Input devices may include, among other things, an engine run/isolation switch, a generator field switch, an automatic brake handle (for the entire train and locomotives), an independent brake handle (for the locomotive only), a lockout device, and any number of circuit breakers. Manual input devices may include switches, levers, pedals, wheels, knobs, push-pull devices, and touch screen displays. The control system may also include a microprocessor-based locomotive control system 237 having at least one programmable logic controller (PLC), a cab electronics system 238, and an electronic air (pneumatic) brake system 236, all mounted within a cab of the locomotive. The cab electronics system 238 may comprise at least one integrated display computer configured to receive and display data from the outputs of one or more of machine gauges, indicators, sensors, and controls. The cab electronics system 238 may be configured to process and integrate the received data, receive command signals from the off-board remote controller interface 104, and communicate commands such as throttle, dynamic braking, and pneumatic braking commands 233 to the microprocessor-based locomotive control system 237.

The microprocessor-based locomotive control system 237 may be communicatively coupled with the traction motors, engines, generators, braking subsystems, input devices, actuators, circuit breakers, and other devices and hardware used to control operation of various components and subsystems on the locomotive 108. In various alternative implementations of this disclosure, some operating commands, such as throttle and dynamic braking commands, may be communicated from the cab electronics system 238 to the locomotive control system 237, and other operating commands, such as braking commands, may be communicated from the cab electronics system 238 to a separate electronic air brake system 236.

The cab electronics system 238 may provide integrated computer processing and display capabilities on-board the train 102, and may be communicatively coupled with a plurality of cab gauges, indicators, and sensors, as well as being configured to receive commands from the remote controller interface 104. The cab electronics system 238 may be configured to process outputs from one or more of the gauges, indicators, and sensors, and supply commands to the locomotive control system 237. In various implementations, the remote controller interface 104 may comprise a laptop, hand-held device, or other computing device or server with software, encryption capabilities, and Internet access for communicating with the on-board controller of the lead locomotive 108 of a lead consist. Control commands generated by the cab electronics system 238 on the lead locomotive 108 of the lead consist may be communicated to the locomotive control system 237 of the lead locomotive of the lead consist, and may be communicated in parallel via a WiFi/cellular modem 250 off-board to the remote controller interface 104. The lead communication unit 120 on-board the lead locomotive of the lead consist may include the WiFi/cellular modem 250 and any other communication equipment required to modulate and transmit the command signals off-board the locomotive and receive command signals on-board the locomotive. As shown in FIG. 3, the remote controller interface 104 may relay commands received from the lead locomotive 108 via another WiFi/cellular modem 250 to another cab electronics system 238 on-board a lead locomotive of a trailing consist.

The control systems and interfaces on-board and off-board the train may embody single or multiple microprocessors, field programmable gate arrays (FPGAs), digital signal processors (DSPs), programmable logic controllers (PLCs), etc., that include means for controlling operations of the train 102 in response to operator requests, built-in constraints, sensed operational parameters, and/or communicated instructions from the remote controller interface 104. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The locomotive 108 may be outfitted with any number and type of sensors known in the art for generating signals indicative of associated operating parameters. In one example, a locomotive 108 may include a temperature sensor configured to generate a signal indicative of a coolant temperature of an engine on-board the locomotive. Additionally or alternatively, sensors may include brake temperature sensors, exhaust sensors, fuel level sensors, pressure sensors, knock sensors, reductant level or temperature sensors, speed sensors, motion detection sensors, location sensors, or any other sensor known in the art. The signals generated by the sensors may be directed to the cab electronics system 238 for further processing and generation of appropriate commands. In addition, such signals may be transmitted to remote controller interface 104 to be recorded in shared ledger 220 and/or transmitted to other components of train 102 and track 106.

Any number and type of warning devices may also be located on-board each locomotive, including an audible warning device and/or a visual warning device. Warning devices may be used to alert an operator on-board a locomotive of an impending operation, for example startup of the engine(s). Warning devices may be triggered manually from on-board the locomotive (e.g., in response to movement of a component to the run state) and/or remotely from off-board the locomotive (e.g., in response to commands from the remote controller interface 104.) When triggered from off-board the locomotive, a corresponding command signal used to initiate operation of the warning device may be communicated to the on-board controller and the cab electronics system 238.

The off-board remote controller interface 104 may include any means for monitoring, recording, storing, indexing, processing, and/or communicating various operational aspects of the locomotive 108. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or non-transitory computer-readable media such as computer chips and secondary storage devices, including hard disks, floppy disks, optical media, CD-ROM, or other forms of RAM or ROM.

The off-board remote controller interface 104 may be configured to execute instructions stored on computer readable media to perform methods of remote control of the locomotive 108. That is, as will be described in more detail in the following section, on-board control (manual and/or autonomous control) of some operations of the locomotive (e.g., operations of traction motors, engine(s), circuit breakers, etc.) may be selectively overridden by the off-board remote controller interface 104.

Remote control of the various powered and non-powered units on the train 102 through communication between the on-board cab electronics system 238 and the off-board remote controller interface 104 may be facilitated via the various communication units 120, 126 spaced along the train 102. The communication units may include hardware and/or software that enables sending and receiving of data messages between the powered units of the train and the off-board remote controller interfaces. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communication units to exchange information between the off-board remote controller interfaces and the various components and subsystems of the train 102.

Figure 5:
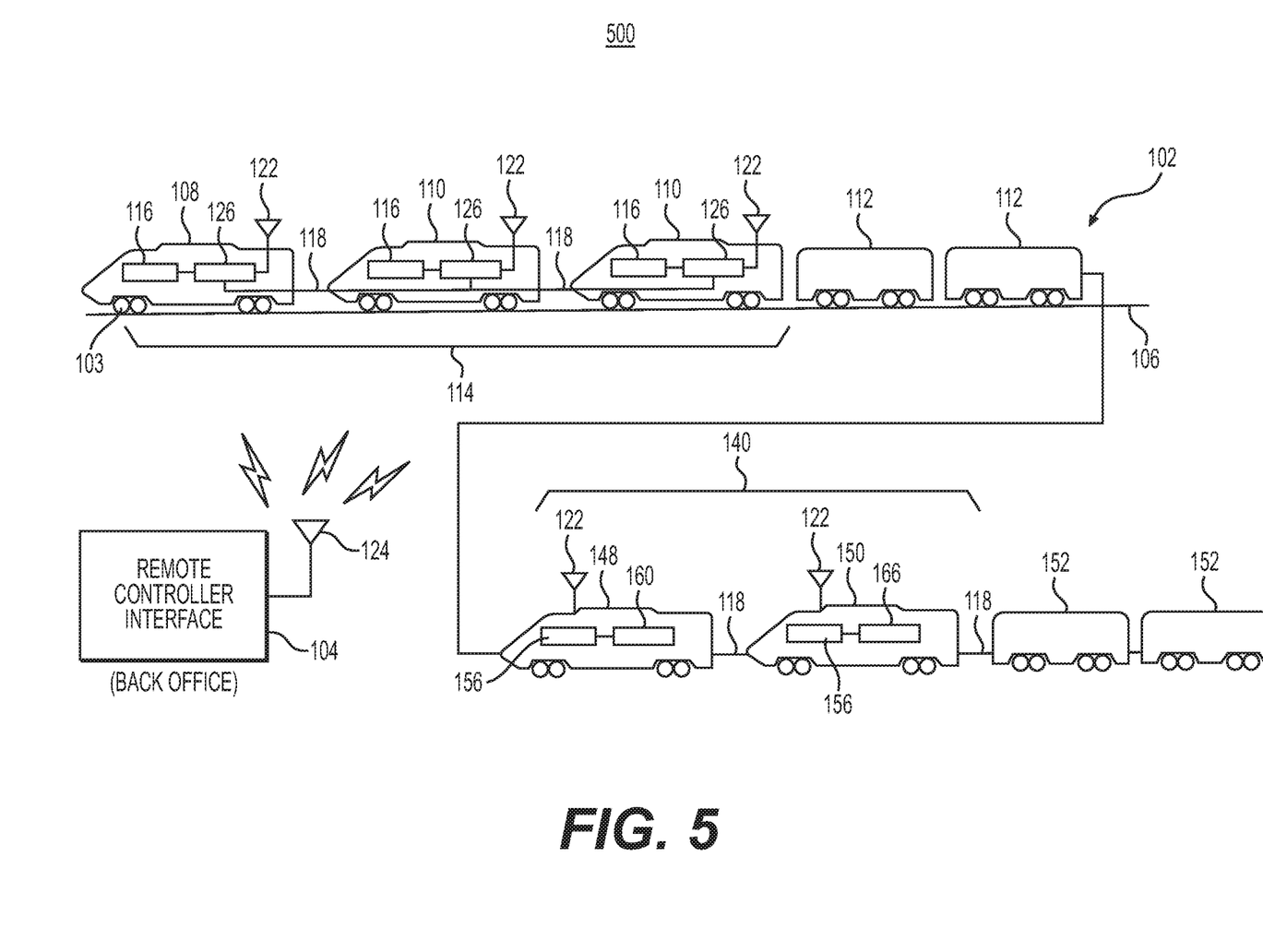
FIG. 5 is a schematic diagram of one embodiment of a control system for a train.

As shown in FIG. 5, the train 102 may include one or more remote or trailing consists 140 of powered locomotives, including powered units 148, 150, and additional non-powered units 112, 152. While the train 102 in FIG. 5 is shown with a lead consist 114, and a trailing consist 140, alternatively, the train 102 may include other numbers of locomotive consists joined together or interconnected by one or more intermediate powered or non-powered units that do not form part of the lead and trailing locomotive consists. Similar to the powered units 108, 110 in the lead consist 114, the propulsion subsystems 156 of the powered units 148, 150 in the trailing consist 140 may be connected and communicatively coupled to each other by the network connection 118, such as a MU cable extending between the powered units 148, 150.

Another lead communication unit 160 may be disposed in the lead powered unit 148 of the trailing consist 140. The lead communication unit 160 of the trailing consist 140 may be a unit that receives data packets forming a message transmitted by the off-board, remote controller interface 104. For example, the lead communication unit 160 of the trailing consist 140 may receive a message from the off-board remote controller interface 104 providing operational commands that are based upon the information transmitted to the off-board remote controller interface 104 via the lead communication unit 120 of the lead powered unit 108 of the lead consist 114. A trailing communication unit 166 may be disposed in a trailing powered unit 150 of the trailing consist 140, and interconnected with the lead communication unit 160 via the network connection 118.

The communication units 120, 126 in the lead consist 114, and the communication units 160, 166 in the trailing consist 140 may be connected with the network connection 118 such that all of the communication units for each consist are communicatively coupled with each other by the network connection 118 and linked together in a computer network. Alternatively, the communication units may be linked by another wire, cable, or bus, or be linked by one or more wireless connections.

Figure 4:
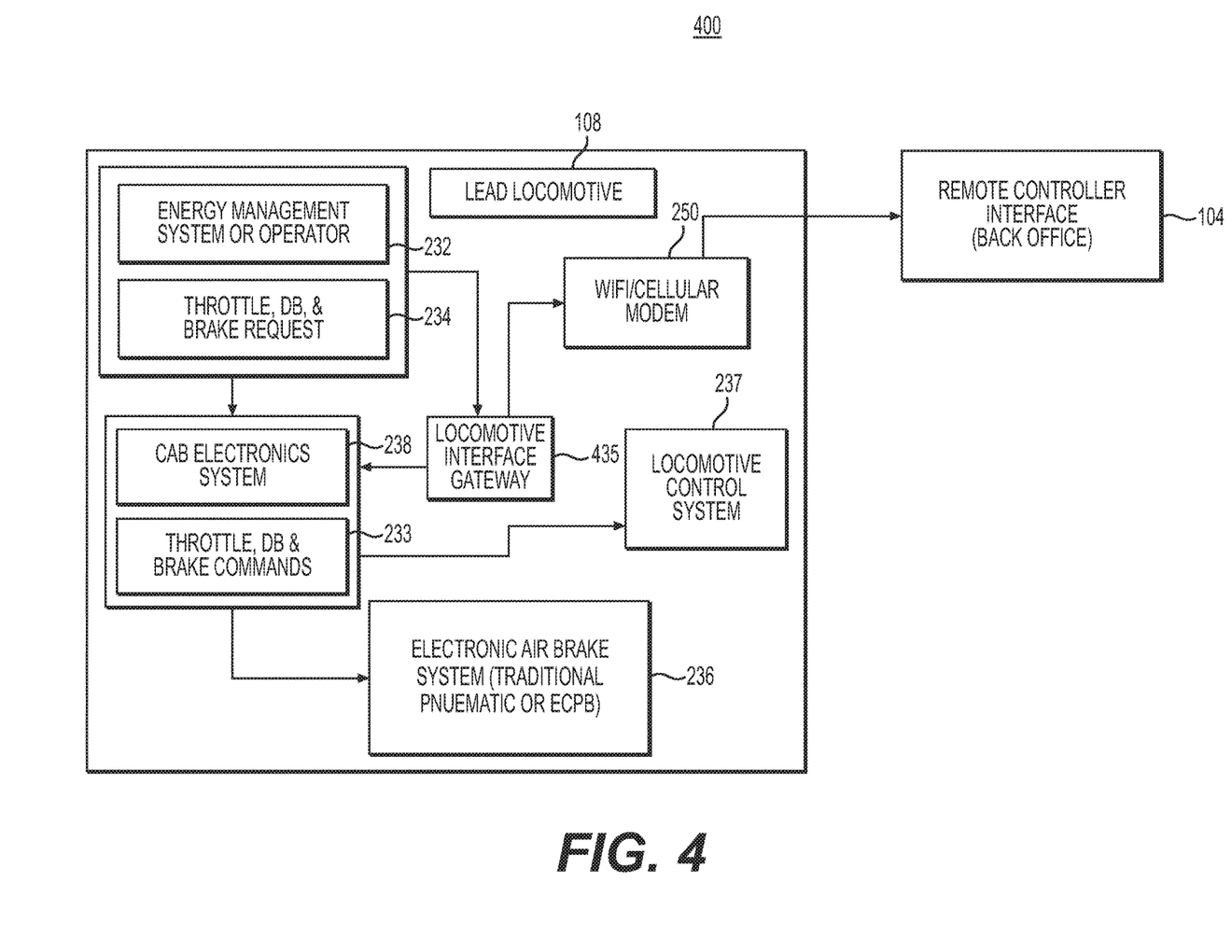
FIG. 4 is a block diagram of another implementation of a portion of the control system illustrated in FIG. 1.

As further shown in FIG. 4, in the exemplary embodiment of a control system 400 according to this disclosure, the cab electronics system 238 may be configured to receive the requests 234 after they have been processed by a locomotive interface gateway 435, which may also enable modulation and communication of the requests through a WiFi/cellular modem 250 to an off-board remote controller interface (back office) 104. The cab electronics system 238 may be configured to communicate commands (e.g., throttle, dynamic braking, and braking commands 233) to the locomotive control system 237 and an electronic air brake system 236 on-board the lead locomotive 108 in order to autonomously control the movements and/or operations of the lead locomotive.

In parallel with communicating commands to the locomotive control system 237 of the lead locomotive 108, the cab electronics system 238 on-board the lead locomotive 108 of the lead consist may also communicate commands to the off-board remote controller interface 104. The commands may be communicated either directly or through the locomotive interface gateway 435, via the WiFi/cellular modem 250, off-board the lead locomotive 108 of the lead consist to the remote controller interface 104. The remote controller interface 104 may then communicate the commands received from the lead locomotive 108 to the trailing consist lead locomotive 148. The commands may be received at the trailing consist lead locomotive 148 via another WiFi/cellular modem 250, and communicated either directly or through another locomotive interface gateway 435 to a cab electronics system 238. The cab electronics system 238 on-board the trailing consist lead locomotive 148 may be configured to communicate the commands received from the lead locomotive 108 of the lead consist to a locomotive control system 237 and an electronic air brake system 236 on-board the trailing consist lead locomotive 148. The commands from the lead locomotive 108 of the lead consist may also be communicated via the network connection 118 from the trailing consist lead locomotive 148 to one or more trailing powered units 150 of the trailing consist 140. The result of configuring all of the lead powered units of the lead and trailing consists to communicate via the off-board remote controller interface 104 is that the lead powered unit of each trailing consist may respond quickly and in close coordination with commands responded to by the lead powered unit of the lead consist. Additionally, each of the powered units in various consists along a long train may quickly and reliably receive commands such as throttle, dynamic braking, and pneumatic braking commands 234 initiated by a lead locomotive in a lead consist regardless of location and conditions.

The integrated cab electronics systems 238 on the powered units 108, 110, of the lead consist 114 and on the powered units 148, 150 of the trailing consist 140 may also be configured to receive and generate commands for configuring or reconfiguring various switches and handles on-board each of the powered units of the train as required before the train begins on a journey, or after a failure occurs that requires reconfiguring of all or some of the powered units. Examples of switches and handles that may require configuring or reconfiguring before a journey or after a failure may include an engine run switch, a generator field switch, an automatic brake handle, and an independent brake handle. Remotely controlled actuators on-board the powered units in association with each of the switches and handles may enable remote, autonomous configuring and reconfiguring of each of the devices. For example, before the train begins a journey, or after a critical failure has occurred on one of the lead or trailing powered units, commands may be sent from the off-board remote controller interface 104 to any powered unit in order to automatically reconfigure all of the switches and handles as required on-board each powered unit without requiring an operator to be on-board the train. Following the reconfiguring of all of the various switches and handles on-board each locomotive, the remote controller interface 104 may also send messages to the cab electronics systems on-board each locomotive appropriate for generating other operational commands such as changing throttle settings, activating or deactivating dynamic braking, and applying or releasing pneumatic brakes. This capability saves the time and expense of having to delay the train while sending an operator to each of the powered units on the train to physically switch and reconfigure all of the devices required.

INDUSTRIAL APPLICABILITY

The disclosed blockchain remote command verification of the present disclosure can be used with any train 102 operating on a track 106 that sends and receives information to a remote device or site.

As discussed above, the disclosed control system 100 including blockchain remote command verification may assist in train security and safety concerns. Especially when an operator is not onboard, the disclosed verification system may help ensure that only authorized commands are sent and received remotely to the train and/or train-associated systems. Thus, the verification system disclosed herein provides security against unauthorized altering or unauthorized submitting of control commands during control the train system, or after when the commands have been stored as a record of past commands and events.

It will be apparent to those skilled in the art that various modifications and variations can be made to the control system and method of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A control system for operating one or more locomotives in a train, the control system comprising:
   a first communication unit located on-board a first locomotive of a first consist in the train;
   an off-board remote controller interface located remotely from the train, the off-board remote controller interface being configured to:
      receive or generate a locomotive control command among a plurality of locomotive control commands;
      store the received or generated locomotive control command in a log file or an event recorder;
      associate a cryptocurrency with the stored locomotive control command;
      store the cryptocurrency in a shared ledger;
      relay the locomotive control command to the first communication unit; and
      after relaying all locomotive control commands among the plurality of locomotive control commands to the first communication unit, assembling the locomotive control commands associated with the cryptocurrency stored in the shared ledger as a record of past commands and events,
   wherein the first communication unit is configured to receive the locomotive control command from the off-board remote controller interface.

2. The control system of claim 1, wherein:
   the train further comprises a second consist of locomotives, and a second communication unit located on-board a second locomotive of the second consist; and
   the second communication unit is configured to transmit the locomotive control command to the off-board remote controller interface.

3. The control system of claim 1, wherein the shared ledger is a blockchain.

4. The control system of claim 1, the off-board remote controller interface further being configured to:
   receive or generate a control command for a switch located within a railroad track;
   store the received or generated control command for the switch in the shared ledger;
   receive sensor data originating from a sensor located within the train, the railroad track, or associated components; and
   store the received sensor data in the shared ledger.

5. The control system of claim 1, further comprising:
   an on-board controller located on-board the first locomotive of the first consist of the train and communicatively coupled with the first communication unit; and
   the on-board controller comprising a cab electronics system, and a locomotive control system,
   the cab electronics system comprising at least one integrated display computer being configured to:
      receive and display data from outputs of one or more of machine gauges, indicators, sensors, and controls;
      process and integrate the received data;
      receive one or more control command signals from the off-board remote controller interface; and
      communicate commands based on the data and the received one or more control command signals,
   the locomotive control system being configured to receive commands communicated from the cab electronics system,
   the on-board controller being in wireless communication with the off-board remote controller interface.

6. The control system of claim 2, wherein the second communication unit comprises a wireless modem configured to communicate data messages in the form of packetized data with the off-board remote controller interface.

7. The control system of claim 1, wherein the locomotive control command comprises at least one of a throttle command, a dynamic braking readiness command, or a brake command.

8. The control system of claim 1, wherein a signal corresponding to the locomotive control command from the off-board remote controller interface is configured to at least one of: change a throttle position, activate or deactivate dynamic braking, or apply or release a brake.

9. The control system of claim 5, further comprising a locomotive interface gateway located on the first locomotive of the first consist, the locomotive interface gateway being configured to receive and modulate commands from the cab electronics system of the first locomotive of the first consist and communicate the modulated commands to the off-board remote controller interface.

10. The control system of claim 5, wherein the locomotive control system is configured to control one or more of circuit breakers, throttle settings, dynamic braking, and pneumatic braking on an associated lead locomotive in accordance with the commands received from the cab electronics system.

11. A train control system, comprising:
   a first consist of locomotives, the first consist comprising a first locomotive and one or more first trailing locomotives;
   a first communication unit located on-board the first locomotive of the first consist; and
   an off-board remote controller interface located remotely from the train and being configured to:

receive or generate a locomotive control command;
store the received or generated locomotive control command in a log file or an event recorder;
associate a cryptocurrency with the stored locomotive control command;
store the cryptocurrency in a shared ledger; and
relay the locomotive control command to the first locomotive of the first consist by transmitting a signal corresponding to the locomotive control command from the off-board remote controller interface to the first communication unit.

12. The train control system of claim 11, further comprising:
a second consist of locomotives, the second consist comprising a second locomotive and one or more second trailing locomotives; and
a second communication unit located on-board the second locomotive of the second consist,
wherein the second communication unit is configured to transmit the locomotive control command to the off-board remote controller interface.

13. The train control system of claim 11, wherein the shared ledger is a blockchain.

14. The train control system of claim 11, wherein first communication unit comprises a wireless modem configured to communicate data messages in the form of packetized data with the off-board remote controller interface.

15. A method for controlling a train, the train comprising a first consist of locomotives, and a first communication unit located on-board a first locomotive of the first consist, the method comprising:
receiving or generating a locomotive control command among a plurality of locomotive control commands by an off-board remote controller interface;
storing, by the off-board remote controller interface, the received or generated locomotive control command in a log file or an event recorder;
associating a cryptocurrency with the stored locomotive control command;
storing the cryptocurrency in a shared ledger;
relaying the locomotive control command to the first communication unit; and
after relaying all locomotive control commands among the plurality of locomotive control commands to the first communication unit, assembling the locomotive control commands stored in the shared ledger as a record of past commands and events.

16. The method of claim 15, wherein:
the train further comprises a second consist of locomotives, and a second communication unit located on-board a second locomotive of the second consist; and
the locomotive control command is received from the second communication unit.

17. The method of claim 16, further comprising:
generating the locomotive control command with an on-board controller located on-board the second locomotive of the second consist, wherein the generating the locomotive control command comprises:
receiving first data from outputs of one or more of machine gauges, indicators, sensors, and controls at a cab electronics system of the second on-board controller;
processing the received first data;
communicating commands from the cab electronics system of the second on-board controller based on the first data and the locomotive control command; and
receiving the commands communicated from the cab electronics system at a locomotive control system;
receiving a signal corresponding to the locomotive control command at the first on-board controller located on-board the first locomotive of the first consist of the train;
receiving second data from outputs of one or more of machine gauges, indicators, sensors, and controls at a cab electronics system of the first on-board controller;
processing the received second data;
communicating commands from the cab electronics system of the first on-board controller based on the second data and the corresponding control command signal; and
receiving the commands communicated from the cab electronics system at a locomotive control system of the first on-board controller.

18. The method of claim 17, wherein the communicating commands and the receiving the signal corresponding to the locomotive control command comprises communication of messages in the form of packetized data over the Internet.

19. The method of claim 15, wherein the shared ledger is a blockchain.

20. The method of claim 15, further including:
receiving or generating a control command for a switch located within a railroad track;
storing the received or generated control command for the switch in the shared ledger;
receiving sensor data originating from a sensor located within the train, the railroad track, or associated components; and
storing the received sensor data in the shared ledger.

* * * * *